United States Patent [19]

Matsuda et al.

[11] Patent Number: 5,766,718
[45] Date of Patent: Jun. 16, 1998

[54] LONGITUDINAL MAGNETIC RECORDING MEDIUM AND APPARATUS

[75] Inventors: Yoshibumi Matsuda, Hachiouji; Masaaki Futamoto, Tukui-gun; Fumio Kugiya, Hachiouji; Yoshinori Miyamura, Nishitama-gun; Takeshi Nakano, Sagamihara; Hisashi Takano, Hachiouji; Kyo Akagi, Fuchu; Mikio Suzuki, Kokubunji; Yasuhide Ouchi, Kodaira, all of Japan

[73] Assignee: Hitachi, Ltd., Tokyo, Japan

[21] Appl. No.: 196,811

[22] Filed: Jan. 31, 1994

Related U.S. Application Data

[63] Continuation of Ser. No. 687,027, Apr. 18, 1991, abandoned.

[30] Foreign Application Priority Data

Apr. 18, 1990 [JP] Japan ................................ 2-100308

[51] Int. Cl.⁶ ................................................ G11B 5/66
[52] U.S. Cl. .............. 428/65.3; 428/694 T; 428/694 TS; 428/694 TR; 428/694 BR; 428/900; 360/131; 360/134; 360/135; 369/277; 369/280; 369/283; 369/286
[58] Field of Search ............................ 428/65.3, 900, 428/694 T, 694 TS, 694 BR; 360/135, 131, 134; 369/277, 280, 283, 286

[56] References Cited

U.S. PATENT DOCUMENTS

| | | | |
|---|---|---|---|
| 4,322,481 | 3/1982 | Krouse | 428/611 |
| 4,698,251 | 10/1987 | Fukudo et al. | 428/65.7 |
| 4,802,050 | 1/1989 | Miyabayashi et al. | 360/135 |
| 4,877,666 | 10/1989 | Muchiy et al. | 428/64.3 |
| 4,911,867 | 3/1990 | Lazzari | 428/65.6 |
| 4,956,213 | 9/1990 | Masuda | 428/64.4 |
| 4,973,496 | 11/1990 | Kruger et al. | 427/129 |
| 5,008,176 | 4/1991 | Kondo et al. | 430/270.11 |
| 5,075,147 | 12/1991 | Usami et al. | 428/64.7 |
| 5,087,481 | 2/1992 | Chen et al. | 427/129 |
| 5,126,180 | 6/1992 | Gotoch et al. | 428/64.4 |
| 5,141,785 | 8/1992 | Yoshinada et al. | 428/1 |

OTHER PUBLICATIONS

Patent Abstracts of Japan vol. 7, No. 64 (p. 183) (1209) 17 Mar. 1983, & JP-A-57 208627.

Proceedings VLSI and Computer Peripherals, May 1989, p. 1-12-1-15; Ian L. Sanders and al.: "Discrete tracks—Possibilities for high-density magnetic disks?" pp. 1-13, left-hand col. line 27 right-hand column, line 7; figure 3.

*Primary Examiner*—Leszek Kiliman
*Attorney, Agent, or Firm*—Antonelli, Terry, Stout & Kraus, LLP

[57] ABSTRACT

It is disclosed that a longitudinal magnetic recording medium and apparatus has recording sections having longitudinal magnetic films magnetically isolated in a recording direction. The magnetically isolated recording sections can record a single bit each so that the longitudinal magnetic recording medium can remove the irregular domain boundary of its own caused on boundaries of magnetization reversals in the recording direction. This can improve the signal-to-media noise ratio to a great extent in writing and reading.

28 Claims, 2 Drawing Sheets

LONGITUDINAL MAGNETIC RECORDING MEDIUM AND APPARATUS

This application is a Continuation Application of Ser. No. 07/687,027 filed Apr. 18, 1991, which is now abandoned.

BACKGROUND OF THE INVENTION

The present invention relates to a longitudinal magnetic recording medium and apparatus and more particularly concerns a longitudinal magnetic recording medium and apparatus preferable for high density recording at a high signal-to-noise ratio.

The longitudinal magnetic recording medium having a longitudinal magnetic film, unlike perpendicular magnetic recording media, involves a problem of high media noise of its own. A longitudinal magnetic recording medium has an irregular domain boundary caused by a strong demagnetizing field produced at a boundary of magnetization reversals in a recording direction. It is known that the irregular domain boundary is a primary cause of the media noise in a read-out operation as reported in the J. Appl. Phys., 53, (1982) pp2576–2578.

It has been proposed that to reduce the media noise the grain of the magnetic film should be made fine to improve magnetic anisotropy to increase coercive force as disclosed in the Japanese Patent Laid-Open 61-217925. It has also been attempted to make the grain boundary of the magnetic film clear with annealing as in disclosed in the Japanese Patent Laid-Open 62-117143.

SUMMARY OF THE INVENTION

However, the method that the coercive force of the longitudinal magnetic film should be made high has the disadvantage that the irregular domain boundary cannot be removed substantially as the magnitude of the coercive force is limited by a material of the longitudinal magnetic film. If the coercive force of the longitudinal magnetic film is greater than 2 kOe, the magnetic field strength of a magnetic head is so low for the coercive force that the medium cannot be recorded saturately. It therefore involves a practical problem that the coercive force is limited in connection with the recording performance of the magnetic head.

On the other hand, the method that the grain boundary of the magnetic film should be made clear has the disadvantage that magnetic isolation is insufficient as the magnetic grains are close. The irregular domain boundary cannot be theoretically made smaller than the size of the grain.

An object of the present invention is to provide a longitudinal magnetic recording medium and apparatus in a way that the irregular domain boundary in a recording direction can be removed completely to reduce the media noise to a level as low as dc-erased noise, thereby improving the media signal-to-noise ratio to a great extent and achieving greater areal recording density than 500 Mb/in$^2$.

Briefly, the foregoing object is accomplished in accordance with aspects of the present invention by a longitudinal magnetic recording medium having a non magnetic substrate and a longitudinal magnetic film formed on the nonmagnetic substrate directly or through a nonmagnetic underlayer, characterized in that the longitudinal magnetic film has a recording section isolated magnetically in a recording direction and that the magnetic isolation is made by air or a nonmagnetic substance.

Also, it is desirable that the longitudinal magnetic recording medium has a plurality of concentric recording tracks, and the recording tracks should be magnetically isolated therebetween by air or a nonmagnetic substance to remove an irregular domain boundary on an edge of the recording track.

Further, it is desirable that a plane shape of the recording section partitioned by isolating in the recording direction and also between recording tracks in the magnetic film should be rectangular with its recording direction being shorter than a direction perpendicular to the recording direction.

Furthermore, the longitudinal magnetic film can be used a multilayered film such as a composite film having longitudinal magnetic films laminated on a perpendicular magnetic film.

Moreover, the magnetic isolation areas of the longitudinal magnetic film can be formed in a way that the grooves are formed on a surface of a nonmagnetic substrate so that they have ruggedness, and such nonmagnetic substrate having ruggedness can have the longitudinal magnetic film formed directly or through an underlayer thereon. Thus, the portion corresponding to the grooves can become the magnetic isolation areas. The protrusion or hill-like portion of the nonmagnetic substrate can have a longitudinal magnetic film having a coercive force not lower than 1 kOe formed thereon, and the grooved portion thereof has a longitudinal magnetic film having a coercive force lower than 1 kOe formed thereon. This allows recording a main signal on the protrusion or hill-like portion and a tracking signal and a servo signal on the grooved portion.

A longitudinal magnetic recording apparatus can be constructed with use of the longitudinal magnetic recording medium described above. A sputtering process, a vacuum evaporating process, or a plating process may be used for forming the longitudinal magnetic recording film forming method for the above described longitudinal magnetic recording medium.

FIG. 1(a) is an illustrative view for a magnetic disk made in a way that it has periodical grooves 5 formed in a radial and circumferential directions to form a recording section (hereinafter referred to as the magnetic film domains) isolated magnetically. The grooves 5 can be formed by way of a lithographic technique using electron rays or X rays. A width of the groove or nonmagnetic area isolating adjacent magnetic film domains is a few nanometers to 5 μm, or preferably 30 nm to 1 μm. The figure shows the surface shape on only a single side of the magnetic disk, but a similar surface shape may be formed on both sides. For the nonmagnetic substrate 1a reinforced glass substrate, a Ni—P plated aluminum substrate, or a ceramic substrate can be used. For the underlayer 2a chrome alloy film such as Cr, Cr—Si, or Cr—Ti or Ge film is employed. The longitudinal magnetic film 3 is Co, Fe, or Ni base alloy. It may have a protective layer 4 such as C, B, SiNx, or SiOx formed thereon.

FIG. 1(b) is an illustrative view for a magnetic disk having recording sections isolated magnetically by intervening, periodically a nonmagnetic substance in a radial direction and the circumferential direction in a magnetic film. Such a magnetic recording medium can be made, for example, by filling the grooves shown in FIG. 1(a) with the nonmagnetic substance or by mask irradiating an oxygen ion beam to the uniformly formed longitudinal film to oxidize the portion corresponding to the groove to change it to nonmagnetic film. The portion of the nonmagnetic area and groove intervening for the magnetic isolation in the recording direction can be used as a clock signal source. The portion of the nonmagnetic area and groove intervening for the magnetic isolation between the recording tracks can be used as a signal source for positioning a magnetic head. It can be used, for example, to position the head at a high accuracy or to precisely record a single bit in the magnetic film domain isolated magnetically that a reflectivity of the laser beam differs in the nonmagnetic area and groove from in the magnetic film domain.

In order to improve the micro-structure and magnetic characteristics of the magnetic film, an underlayer can be provided, to control crystalline orientation of magnetic film, between the magnetic film and the nonmagnetic substrate.

Further, the magnetic disk can have a spiral groove formed from its center to the circumference and have periodical grooves made in the recording direction to form magnetic film domains.

In the longitudinal magnetic recording medium using the longitudinal magnetic film, the longitudinal magnetic film is magnetically isolated in the recording direction by the grooves or nonmagnetic areas, and the magnetically isolated recording sections each have an assigned bit recorded thereon. This can magnetically isolate the boundary of magnetization reversals in the recording direction. It therefore can remove the irregular domain boundary caused on boundaries of magnetization reversals in the recording direction of the magnetic recording medium using the longitudinal magnetic film of its own. The removal of the irregular domain boundary which is a principal cause of the media noise can decrease the media noise to a level as low as the dc-erased noise so that the write/read signal-to-media noise ratio can be improved to a great extent.

In addition, as discussed in the IEEE, Trans. Magnetic, MAG23, (1987) pp3690-3692, a plurality of concentric grooves can be formed on the magnetic disk so that the so-called discrete track which isolates the neighboring recording tracks can be formed to remove the irregular domain boundaries at edges of the recording tracks. As this irregular domain boundary also is thought as a cause of the media noise, removal of it can further improve the signal-to-media noise ratio in the writing and reading modes of operation.

In the magnetic film domain formed by the magnetic isolation in the recording direction and the one between the recording tracks, the width of the magnetically isolated grooves or nonmagnetic areas can be made narrower and at the same time at least one of the lengths in the recording direction and track direction of the magnetic film domains can be made shorter so that the areal recording density can be controlled to increase the density.

DETAILED DESCRIPTION OF THE PREFERRED EMBODIMENTS

[Embodiment 1]

Figure 2:
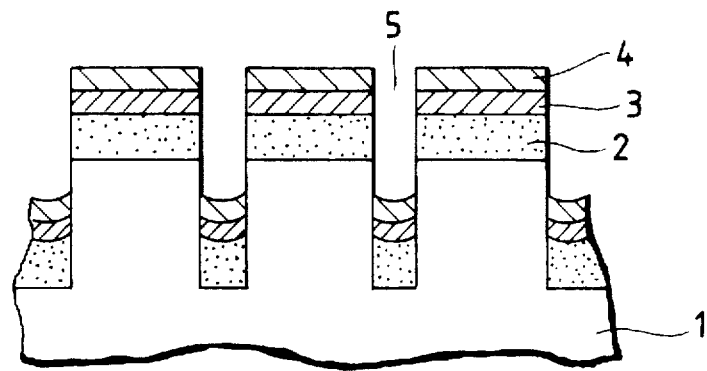
FIG. 2 is a cross-sectional view of magnetic disks in embodiments 1 and 4 according to the present invention.

FIG. 2 is a cross-sectional structure in the vicinity of a surface of a longitudinal magnetic recording medium of an embodiment according to the present invention. The following describes the embodiment with reference to the figure. First, a substrate 1 of reinforced glass disk of 130 mm diameter and 1.5 mm thick has concentric grooves 5 of 400 nm deep and 1.0 μm wide at intervals of 5.0 μm formed in its circumferential directions on each of the surfaces thereof and grooves of 400 nm deep and 0.2 μm wide at intervals of 0.5 μm formed in its radial directions thereon by way of the photolithographic technique. Each of the surfaces, in turn, has a nonmagnetic underlayer 2, a magnetic film 3, and a protective layer 4 formed in a vacuum chamber using a dc magnetron sputtering system. The nonmagnetic underlayer 2 is formed of Cr film of 250 nm thick in a sputtering condition that substrate temperature is 200° C., argon gas pressure is 0.7 Pa, and applied power density is 50 kW/m². The magnetic film 3 is formed of Co-10 at % Cr-12 at % Pt of 100 nm thick having an axis of easy magnetization in a longitudinal direction of the substrate 1 in the same condition. The protective layer 4 is formed of carbon of 20 nm thick in a sputtering condition that the substrate temperature is 100° C., the argon gas pressure is 1.3 Pa, and the applied power density is 30 kW/m². This completely forms the longitudinal magnetic recording medium, or magnetic disk.

[Reference Example 1]

An alternative magnetic disk is formed in the same construction and the same sputtering conditions as in the embodiment 1 described above except that the reinforced glass disk of 130 mm diameter and 1.5 mm thick has no grooves formed in the radial directions on each of the surfaces.

[Reference Example 2]

Another alternative magnetic disk is formed in the same construction and the same sputtering conditions as in the embodiment 1 described above except that the reinforced glass disk of 130 mm diameter and 1.5 mm thick has no grooves formed in both the circumferential and radial directions on each of the surfaces.

Table 1 shows results of evaluation of write/read characteristics of the magnetic disks obtained in the embodiment 1 and the reference examples 1 and 2 where spacing of a thin film head to the surface of the magnetic film is 0.22 μm. As can be clearly seen from the results, the embodiment 1 having the grooves formed in the both circumferential and radial directions on the reinforced glass substrate for the magnetic disk is improved in signal-to-medium noise ratio to a great extent as compared with the reference example 1 having the grooves formed in the circular directions alone and the reference example 2 having no grooves at all.

[Embodiment 2]

Figure 3:
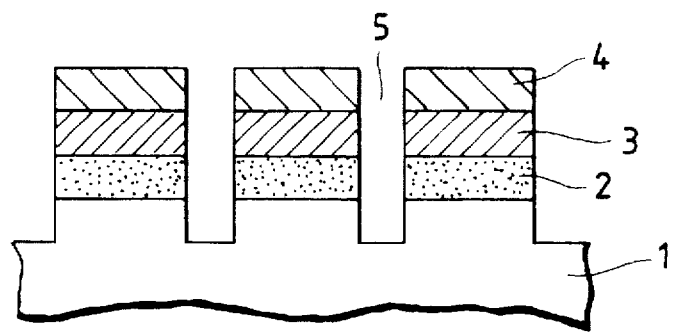
FIGS. 3 and 4 are cross-sectional views of magnetic disks in embodiments 2 and 3 according to the present invention.

FIG. 3 is a cross-sectional structure in the vicinity of a surface of a longitudinal magnetic recording medium of another embodiment according to the present invention. As shown in the figure, a magnetic disk substrate 1 formed of reinforced glass of 95 mm diameter and 1.2 mm thick has a nonmagnetic underlayer 2, a magnetic film 3, and a protective layer 4 formed on each of the surfaces thereof in a vacuum chamber using a dc magnetron sputtering system. The nonmagnetic underlayer 2 is formed of Cr film of 250 nm thick in a sputtering condition that substrate temperature is 200° C., argon gas pressure is 0.7 Pa, and applied power density is 50 kW/m². The magnetic film 3 is formed of Co-10 at % Cr-12 at % Pt of 100 nm thick having an axis of easy magnetization in a longitudinal direction of the substrate 1 in the same condition. The protective layer 4 is formed of carbon of 20 nm thick in a sputtering condition that the substrate temperature is 100° C., the argon gas pressure is 1.3 Pa, and the applied power density is 30 kW/m². Then, each of the surfaces has concentric grooves 5 of 150 nm deep and 1.0 μm wide at intervals of 5.0 μm formed in its circumferential directions and grooves of 150 nm deep and 0.2 μm wide at intervals of 0.5 μm formed in its radial directions thereon by way of the photolithographic technique. This completely forms the longitudinal magnetic recording medium, or magnetic disk.

[Reference Example 3]

An alternative magnetic disk substrate 1 formed of reinforced glass of 95 mm diameter and 1.2 mm thick has a nonmagnetic underlayer 2, a magnetic film 3, and a protective layer 4 formed in a vacuum chamber using a dc magnetron sputtering system on both side thereof, and is formed in the same construction and the same sputtering conditions as in the embodiment 2 described above except that it has no grooves formed in the radial directions on both the surfaces.

Table 1 shows results of evaluation of write/read characteristics of the magnetic disk obtained in the embodiment 2 and the reference example 3. As can be clearly seen from the results, the embodiment 2 having the grooves formed in the both circumferential and radial directions on the reinforced glass substrate for the magnetic disk is improved in signal-to-medium noise ratio to a great extent as compared with the reference example 3 having the grooves formed in the circumferential directions alone.

[Embodiment 3]

Figure 4:
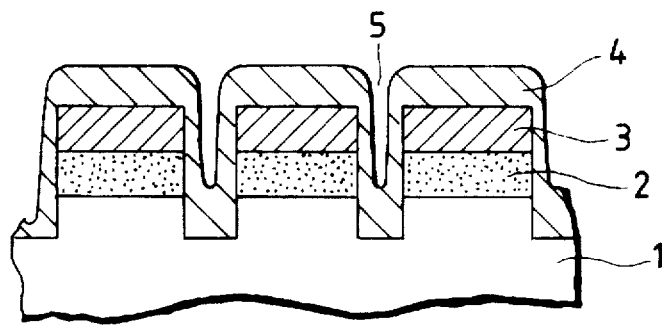

FIG. 4 is a cross-sectional structure in the vicinity of a surface of a longitudinal magnetic recording medium of another embodiment according to the present invention. As shown in the figure, a magnetic disk substrate 1 formed of reinforced glass of 95 mm diameter and 1.2 mm thick has a nonmagnetic underlayer 2 and a magnetic film 3 formed on each of the surfaces thereof in a vacuum chamber using a dc magnetron sputtering system. The nonmagnetic underlayer 2 is formed of Cr film of 300 nm thick in a sputtering condition that substrate temperature is 200° C., argon gas pressure is 0.7 Pa, and applied power density is 50 kW/m². The magnetic film 3 is formed of Co-12 at % Cr-10 at % Pt of 100 nm thick having an axis of easy magnetization in a longitudinal direction of the substrate 1 in the same condition. Then, each of the surfaces has concentric grooves 5 of 150 nm deep and 1.0 μm wide at intervals of 5.0 μm formed in its circumferential directions and grooves of 150 nm deep and 0.2 μm wide at intervals of 0.5 pm formed in its radial directions thereon by way of the photolithographic technique. Further, each of the surfaces has a protective layer 4 is formed of carbon of 20 nm thick in a sputtering condition that the substrate temperature is 100° C., the argon gas pressure is 1.3 Pa, and the applied power density is 30 kW/m², using the dc magnetron sputtering system. This complete forming the longitudinal magnetic recording medium, or magnetic disk.

[Reference Example 4]

An alternative magnetic disk is formed in the same construction and the same sputtering conditions as in the embodiment 3 described above except that the reinforced glass substrate 1 of 95 mm diameter and 1.2 mm thick has no grooves formed in both the circumferential and the radial directions on each of the surfaces.

Table 1 shows results of evaluation of write/read characteristics of the magnetic disk obtained in the embodiment 3 and the reference example 4. As can be clearly seen from the results, the embodiment 3 having the grooves formed in the both circumferential and radial directions on the reinforced glass substrate for the magnetic disk is improved in signal-to-medium noise ratio to a great extent as compared with the reference example 4 having no grooves at all. Also, the magnetic disk in the embodiment 3 has higher corrosion resistance than the one in the embodiment 2 as walls of the grooves formed on the magnetic film are covered with the carbon.

[Embodiment 4]

In FIG. 2, a substrate 1 of reinforced glass disk of 95 mm diameter and 1.2 mm thick has a spiral groove of 200 nm deep and 1.0 μm wide at intervals of 5.0 μm formed from a center thereof to a circumference thereof on each of surfaces thereof and grooves of 200 nm deep and 0.2 μm wide at intervals of 0.5 μm formed in its radial directions thereon by way of the photolithographic technique. Each of the surfaces, in turn, has a nonmagnetic underlayer 2, a magnetic film 3, and a protective layer 4 formed in a vacuum chamber using a dc magnetron sputtering system. The nonmagnetic underlayer 2 is formed of Cr film of 250 nm thick in a sputtering condition that substrate temperature is 100° C., argon gas pressure is 0.7 Pa, and applied power density is 50 kW/m². The magnetic film 3 is formed of Co-10 at % Cr-12 at % Pt of 100 nm thick having an axis of easy magnetization in a longitudinal direction of the substrate 1 in the same condition. The protective layer 4 is formed of carbon of 20 nm thick in a sputtering condition that the substrate temperature is 100° C. the argon gas pressure is 1.3 Pa, and the applied power density is 30 kW/m². This complete forming the longitudinal magnetic recording medium, or magnetic disk. Results of evaluation of write/read characteristics of the magnetic disk obtained in the embodiment, as shown in Table 1, are high in the signal-to-medium noise ratio.

[Embodiment 5]

Figure 5:
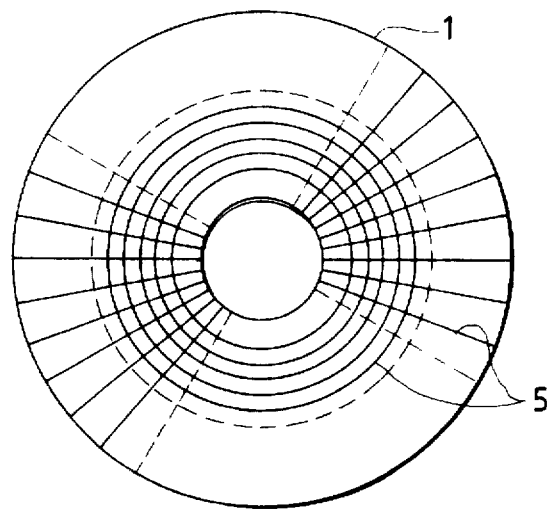
FIG. 5 is a schematic view illustrative of a substrate surface of a magnetic disk in embodiment 5 according to the present invention.

As shown in FIG. 5, a substrate 1 of reinforced glass disk of 95 mm diameter and 1.2 mm thick has grooves of 250 nm deep and 1.0 μm wide at intervals of 5.0 μm formed in circumferential directions on each of the surfaces thereof and grooves 250 nm deep formed in radial directions thereof at central angles of 6.0×10⁻⁴ deg. by way of the photolithographic technique. In according with the embodiment of FIG. 2, each of the surfaces of the substrate 1 in FIG. 5 has a nonmagnetic underlayer 2, a magnetic film 3, and a protective layer 4 formed in the same vacuum chamber using a dc magnetron sputtering system. The nonmagnetic underlayer 2 is formed of Cr film of 200 nm thick in a sputtering condition that substrate temperature is 100° C., argon gas pressure is 0.6 Pa, and applied power density is 50 kW/m². The magnetic film 3 is formed of Co-10 at % Cr-12 at % Pt of 100 nm thick having an axis of easy magnetization in a longitudinal direction of the substrate 1 in the same condition. The protective layer 4 is formed of carbon of 20 nm thick in a sputtering condition that the substrate temperature is 100° C., the argon gas pressure is 1.3 Pa, and the applied power density is 30 kW/m². This completely forms the longitudinal magnetic recording medium, or magnetic disk. Results of evaluation of write/read characteristics of the magnetic disk obtained in the embodiment, as shown in Table 1, are high in the signal-to-medium noise ratio.

An alternative method for forming the grooves on the above mentioned magnetic disk substrate or the thin film formed thereon may be an electron beam lithography process or a mechanical cutting process.

[Embodiment 6]

Figure 1A:
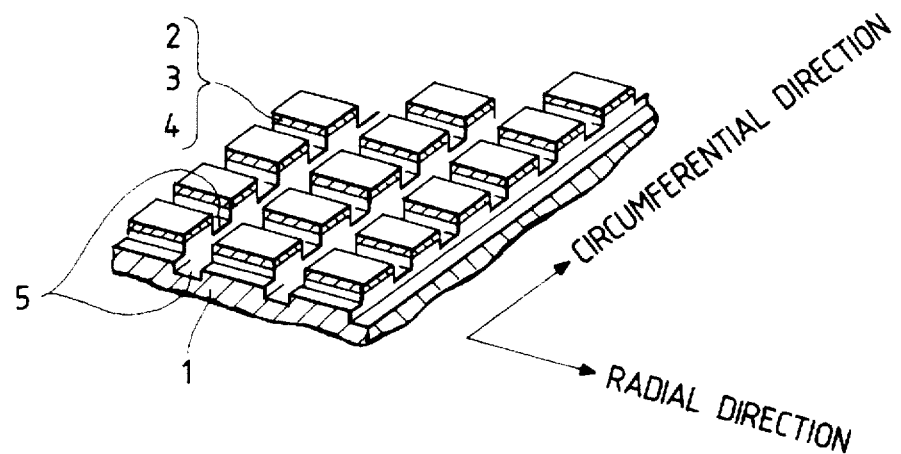
FIGS. 1(a) and 1(b) are illustrative views for a magnetic disk in an embodiment of the present invention.
Figure 1B:
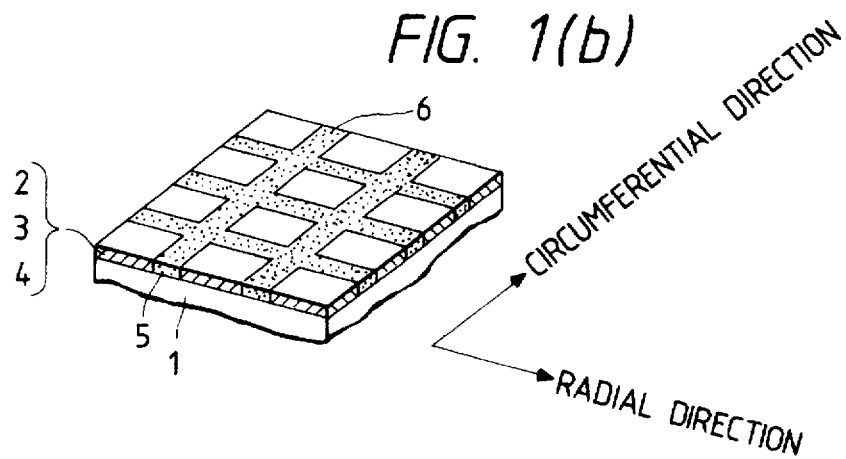

A disk formed of reinforced glass of 1.2 mm thick has a nonmagnetic underlayer 2, a magnetic film 3, and a protective layer 4 formed on each the surfaces thereof in a vacuum chamber using a dc magnetron sputtering system. The nonmagnetic underlayer 2 is formed of Cr film of 250 nm thick in a sputtering condition that substrate temperature is 100° C., argon gas pressure is 0.7 Pa, and applied power density is 50 kW/m$^2$. The magnetic film 3 is formed of Co-10 at % Cr-12 at % Pt of 100 nm thick having an axis of easy magnetization in a longitudinal direction of the substrate 1 in the same condition. The protective layer 4 is formed of carbon of 20 nm thick in a sputtering condition that the substrate temperature is 100° C., the argon gas pressure is 1.3 Pa, and the applied power density is 30 kW/m$^2$. Then, each of the surfaces, as shown in FIG. 1(b), has a mask having gaps of 1.0 μm wide at intervals of 5.0 μm in its circumferential directions and of 0.2 μm wide at intervals of 0.5 μm in its radial directions formed thereon. Further, the mask is irradiated with an oxygen ion beam to form a nonmagnetic area 6 on the magnetic film 3 existing under the gaps. This completely forms the longitudinal magnetic recording medium, or magnetic disk. Results of evaluation of write/read characteristics of the magnetic disk obtained in the embodiment, as shown in Table 1, are high in the signal-to-medium noise ratio.

TABLE 1

| Groove or Nonmagnetic Area | | | |
|---|---|---|---|
| Circumferential direction | Radial direction | Media S/N | Note |
| Yes (substrate, concentric) | Yes (substrate, equal space) | 12 | Embodiment 1 |
| Yes (film, concentric) | Yes (film, equal space) | 13 | Embodiment 2 |
| Yes (film, concentric) | Yes (film, equal space) | 13 | Embodiment 3 |
| Yes (film, spiral) | Yes (film, equal space) | 12 | Embodiment 4 |
| Yes (film, concentric) | Yes (film, radially) | 12 | Embodiment 5 |
| Yes (film, concentric) | Yes (film, equal space) | 12 | Embodiment 6 |
| Yes (substrate, concentric) | No | 6 | Reference Example 1 |
| No | No | 5 | Reference Example 2 |
| Yes (film, concentric) | No | 7 | Reference Example 3 |
| No | No | 4 | Reference Example 4 |

In writing and reading of the magnetic disks described in the embodiments 1, 2, 3, 4, 5, and 6 above, the magnetic head is positioned in a way that a semiconductor laser is used to detect position of the groove or nonmagnetic area, or that a magnetic film of high coercive force is formed for recording a clock signal between the nonmagnetic substrate and the magnetic film for magnetic recording. Each of the magnetic films isolated by the groove or nonmagnetic area has a single bit recorded thereon to allow self-clocking and writing/reading in an NRZ or NRZ-I coding technique. Alternatively, two or more ones of the isolated magnetic film domains can be made to record respectively in reversed directions in magnetization so that write/read can be made in a (1,7), (2, 7) coding technique or a coding technique in which only the minimum distance of magnetization reversals is limited.

A similar effect can be found by replacing the reinforced glass used as the nonmagnetic substrate in the above described embodiments by Ni—P plated aluminum alloy substrate, ceramic substrate, plastic substrate, or plastic film coated aluminum alloy substrate.

In the embodiments 1, 2, 3, 4, 5, and 6, the groove 5 can be filled with nonmagnetic substance such as high molecular lubricant to increase the durability and corrosion resistance.

A similar effect can be found by replacing the magnetic film 3 used in the above described embodiments 1, 2, 3, 4, 5, and 6 by Co—Cr—Ta, Co—Ni—Zr, or Co—Ni—Cr.

As described so far, the advantages of the longitudinal magnetic recording media and apparatus of the present invention consist in particular in the fact that the signal-to-media noise ratio and the recording capacity can be increased to a great extent in the writing and reading modes of operation as compared with the conventional ones in the way that the nonmagnetic substrate for the magnetic recording media or the longitudinal magnetic film formed thereon for the longitudinal magnetic recording media has the grooves or nonmagnetic areas formed in the recording direction, or both in the recording direction and between the recording tracks to form the magnetically isolated magnetic film domain to remove the irregular domain boundary caused on the boundary of magnetization reversals.

What is claimed is:

1. A longitudinal magnetic recording medium having a nonmagnetic substrate and a longitudinal magnetic film formed overlying the nonmagnetic substrate, the substrate having a shape of a disk, the longitudinal magnetic film overlying a surface of the disk such that the recording medium is a longitudinal magnetic recording disk, the longitudinal magnetic recording disk having recording tracks, characterized in that each recording track has a plurality of recording segments, of said longitudinal magnetic film, overlying surface regions of the nonmagnetic substrate, a recording segment and a respective surface region of the nonmagnetic substrate that the recording segment overlies being separated from an adjacent recording segment and a respective surface region of the nonmagnetic substrate that the adjacent recording segment overlies, along a recording track direction, whereby the recording segments are magnetically isolated from each other along the recording track direction.

2. A longitudinal magnetic recording medium according to claim 1, wherein the recording tracks are a plurality of concentric recording tracks, and the recording tracks are magnetically isolated therebetween by air or nonmagnetic substance.

3. A longitudinal magnetic recording medium according to claim 2, wherein a plane shape of each of the recording segments is rectangular with its recording direction being shorter than a direction perpendicular to the recording direction.

4. A longitudinal magnetic recording medium according to claim 3, wherein the longitudinal magnetic film is a composite film having a longitudinal magnetic film laminated on a perpendicular magnetic film.

5. A longitudinal magnetic recording medium according to claim 3, wherein the nonmagnetic substrate has grooves formed on its surfaces, which extend radially with respect to the concentric recording tracks, to thereby form adjacent surface regions of the nonmagnetic substrate that are separated from each other along the recording track direction, the grooves serving as the magnetic isolation areas.

6. A longitudinal magnetic recording medium according to claim 5, wherein a protrusion portion of the nonmagnetic substrate has a longitudinal magnetic film having a coercive force not lower than 1 kOe formed thereon, and a grooved portion thereof has a longitudinal magnetic film having a coercive force lower than 1 kOe formed thereon.

7. A longitudinal magnetic recording apparatus, wherein the longitudinal magnetic recording medium according to any one of claims 1–6 is used.

8. A longitudinal magnetic recording medium according to claim 1, wherein the separated recording segments are separated from each other along the recording track direction by air or by a nonmagnetic substance.

9. A longitudinal magnetic recording medium according to claim 1, wherein the nonmagnetic substrate is made of a material selected from a group consisting of reinforced glass, ceramics, Ni—P plated aluminum, plastic and plastic-coated aluminum alloy.

10. A longitudinal magnetic recording medium according to claim 9, wherein the nonmagnetic substrate is made of reinforced glass.

11. A longitudinal magnetic recording medium according to claim 1, wherein a separation between recording segments along the recording track direction is 30 nm to 5 μm.

12. A longitudinal magnetic recording medium according to claim 1, wherein the nonmagnetic substrate has opposed surfaces, and the longitudinal magnetic film is formed either directly or through a nonmagnetic underlayer on both of the opposed surfaces of the nonmagnetic substrate.

13. A longitudinal magnetic recording medium according to claim 1, wherein the longitudinal magnetic film is formed directly on the nonmagnetic substrate, and wherein a recording segment and its respective surface region of the substrate it is directly on are separated from the adjacent recording segment and its respective surface region of the substrate that it is directly on, along the recording track direction.

14. A longitudinal magnetic recording medium according to claim 1, wherein a nonmagnetic underlayer is sandwiched between the nonmagnetic substrate and the longitudinal magnetic film, the nonmagnetic underlayer being divided into underlayer segments, respectively underlying recording segments of said longitudinal magnetic film, and wherein a recording segment, its underlying underlayer segment and the respective surface region the recording segment overlies, is separated from an adjacent recording segment, its underlying underlayer segment and the respective surface region the adjacent recording segment overlies, along the recording track direction.

15. A longitudinal magnetic recording medium having a nonmagnetic substrate and a longitudinal magnetic film formed overlying the nonmagnetic substrate and adapted to be recorded in a recording direction extending along the longitudinal extent of the magnetic film, the substrate having a shape of a disk, the longitudinal magnetic film overlying a surface of the disk such that the recording medium is a longitudinal magnetic recording disk, the longitudinal magnetic recording disk having recording tracks, wherein each recording track has a plurality of recording segments, of said longitudinal magnetic film, overlying surface regions of the nonmagnetic substrate, a recording segment and a respective surface region of the nonmagnetic substrate that the recording segment overlies being separated from an adjacent recording segment and a respective surface region of the nonmagnetic substrate that the adjacent recording segment overlies, along a recording track direction, whereby the plurality of recording segments are magnetically isolated from each other along the recording track direction.

16. A longitudinal magnetic recording medium according to claim 15, wherein the recording tracks are a plurality of concentric recording tracks, and the recording tracks are magnetically isolated from each other by air or nonmagnetic substance, and wherein each of said recording tracks has a plurality of separated recording segments along the recording track direction which are magnetically isolated from one another by air or nonmagnetic substance.

17. A longitudinal magnetic recording medium according to claim 16, wherein a plane shape of each of the recording segments is rectangular with its recording direction being shorter than a direction perpendicular to the recording direction.

18. A longitudinal magnetic recording medium according to claim 17, wherein the longitudinal magnetic film is a composite film having a longitudinal magnetic film laminated on a perpendicular magnetic film.

19. A longitudinal magnetic recording medium according to claim 17, wherein the nonmagnetic substrate has grooves formed on its surfaces which extend radially with respect to the concentric recording tracks, to thereby form adjacent surface regions of the nonmagnetic substrate that are separated from each other alone the recording track direction, the grooves serving as the magnetic isolation areas.

20. A longitudinal magnetic recording medium according to claim 19, wherein a protrusion portion of the nonmagnetic substrate has a longitudinal magnetic film having a coercive force not lower than 1kOe formed thereon, and a grooved portion thereof has a longitudinal film having a coercive force lower than 1 kOe formed thereon.

21. A longitudinal magnetic recording apparatus, comprising a longitudinal magnetic recording medium according to any one of claims 15–20.

22. A longitudinal magnetic recording medium according to claim 15, wherein the separated recording segments are separated from each other along the recording track direction by air or by a nonmagnetic substance.

23. A longitudinal magnetic recording medium according to claim 15, wherein the nonmagnetic substrate is made of a material selected from a group consisting of reinforced glass, ceramics, Ni—P plated aluminum, plastic and plastic-coated aluminum alloy.

24. A longitudinal magnetic recording medium according to claim 23, wherein the nonmagnetic substrate is made of reinforced glass.

25. A longitudinal magnetic recording medium according to claim 15, wherein a separation between recording segments along the recording track direction is 30 nm to 5 μm.

26. A longitudinal magnetic recording medium according to claim 15, wherein the nonmagnetic substrate has opposed surfaces, and the longitudinal magnetic film is formed either directly or through a nonmagnetic underlayer on both of the opposed surfaces of the nonmagnetic substrate.

27. A longitudinal magnetic recording medium according to claim 15, wherein the longitudinal magnetic film is formed directly on the nonmagnetic substrate, and wherein a recording segment and its respective surface region of the substrate it is directly on are separated from the adjacent recording segment and its respective surface region of the substrate that it is directly on, along the recording track direction.

28. A longitudinal magnetic recording medium according to claim 15, wherein a nonmagnetic underlayer is sandwiched between the nonmagnetic substrate and the longitudinal magnetic film, the nonmagnetic underlayer being divided into underlayer segments, respectively underlying recording segments of said longitudinal magnetic film, and wherein a recording segment, its underlying underlayer segment and the respective surface region the recording segment overlies, is separated from an adjacent recording segment, its underlying underlayer segment and the respective surface region the adjacent recording segment overlies, along the recording track direction.

* * * * *